United States Patent [19]

Baba et al.

[11] Patent Number: 4,783,269

[45] Date of Patent: Nov. 8, 1988

[54] INJECTION CONTROL SYSTEM OF FLOCCULATING AGENT

[75] Inventors: Kenji Baba; Shoji Watanabe; Naoki Hara, all of Hitachi; Mikio Yoda, Ibaraki; Shunji Mori, Hitachi; Shunsuke Nogita, Hitachi; Yuzi Yamasawa, Hitachiota; Toshimitu Akiyama, Fukuoka, all of Japan

[73] Assignee: Hitachi, Ltd., Tokyo, Japan

[21] Appl. No.: 37,157

[22] Filed: Apr. 10, 1987

[30] Foreign Application Priority Data

Apr. 10, 1986 [JP] Japan .................................. 61-82952
Apr. 10, 1986 [JP] Japan .................................. 61-82953

[51] Int. Cl.$^4$ ............................................... C02F 1/52
[52] U.S. Cl. ....................................... 210/709; 210/85; 210/96.1; 210/143; 358/101; 358/107; 364/500
[58] Field of Search ............... 210/702, 709, 738, 739, 210/85, 96.1, 138, 139, 143; 356/335, 336; 358/99, 101, 107; 364/502; 382/8

[56] References Cited

U.S. PATENT DOCUMENTS

| | | | |
|---|---|---|---|
| 4,282,093 | 8/1981 | Haga et al. | 210/709 |
| 4,654,139 | 3/1987 | Baba et al. | 210/205 |
| 4,661,845 | 4/1987 | Saito et al. | 358/99 |

FOREIGN PATENT DOCUMENTS

| | | | |
|---|---|---|---|
| 2704080 | 8/1978 | Fed. Rep. of Germany | 210/96.1 |
| 54-143296 | 11/1979 | Japan. | |
| 59-29281 | 7/1984 | Japan. | |
| 2129549 | 5/1984 | United Kingdom | 356/335 |

Primary Examiner—Peter Hruskoci
Attorney, Agent, or Firm—Antonelli, Terry & Wands

[57] ABSTRACT

An injection control system of a flocculating agent comprises: a flocculating pool into which the inflow liquid flocculating agent is injected and which forms flocs of suspended matters in the liquid; flocculating agent injecting means for injecting the flocculating agent into the flocculating pool; floc image pickup means for photographing a state of the flocs in the flocculating pool and for converting luminance data of the flocs into an electric signal; image recognizing means for recognizing the shape of floc by binarizing the image signal derived from the floc image pickup means on the basis of a luminance level of each pixel; flocculation state deciding means for calculating a characteristic amount of a diameter distribution of the flocs on the basis of the floc shapes recognized by the image recognizing means; and injection amount control means for controlling an amount of the flocculating agent which is injected from the flocculating agent injecting means on the basis of the characteristic amount.

18 Claims, 14 Drawing Sheets

FIG. 10

| $g_0(1,1)$ | $g_0(1,2)$ | | | $g_0(1.256)$ |
|---|---|---|---|---|
| $g_0(2,1)$ | $g_0(2,2)$ | | | |
| $g_0(3,1)$ | $g_0(3,2)$ | | | |
| | | | | |
| $g_0(255,1)$ | | | | $g_0(255,256)$ |
| $g_0(256,1)$ | $g_0(256,2)$ | | | $g_0(256,256)$ |

FIG. 11

| $g_0(1,1)$ | $g_0(1,2)$ | $g_0(1,3)$ | $g_0(1,4)$ |
|---|---|---|---|
| $g_0(2,1)$ | $g_0(2,2)$ | $g_0(2,3)$ | $g_0(2,4)$ |
| $g_0(3,1)$ | $g_0(3,2)$ | $g_0(3,3)$ | $g_0(3,4)$ |

FIG. 12

| $f(1,1)$ | $f(1,2)$ | $f(1,3)$ |
|---|---|---|
| $f(2,1)$ | $f(2,2)$ | $f(2,3)$ |
| $f(3,1)$ | $f(3,2)$ | $f(3,3)$ |

FIG. 13

| | | |
|---|---|---|
| | $g^*(2,2)$ | $g^*(2,3)$ |
| | | |

FIG. 14

| $g_0(1,2)$ | $g_0(1,3)$ | $g_0(1,4)$ |
|---|---|---|
| $g_0(2,2)$ | $g_0(2,3)$ | $g_0(2,4)$ |
| $g_0(3,2)$ | $g_0(3,3)$ | $g_0(3,4)$ |

FIG. 15
| 0 | -2 | 0 |
|---|----|---|
| -2 | 8 | -2 |
| 0 | -2 | 0 |
FIG. 16
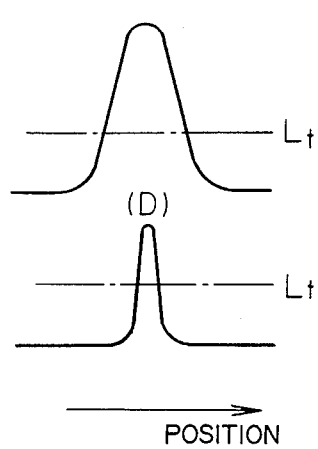
FIG. 17
| u | u | u | u | u |
|---|---|---|---|---|
| u | 0 | -4 | 0 | u |
| u | -4 | 16 | -4 | u |
| u | 0 | -4 | 0 | u |
| u | u | u | u | u |
FIG. 18
| 0 | 0 | 0 | 0 | 0 |
|---|---|---|---|---|
| 0 | 0 | 0 | 0 | 0 |
| 0 | 0 | 1 | 0 | 0 |
| 0 | 0 | 0 | 0 | 0 |
| 0 | 0 | 0 | 0 | 0 |
FIG. 19
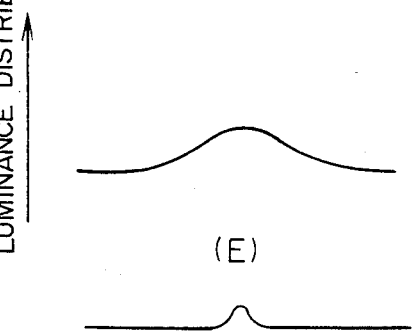
POSITION

FIG. 20

| 1 | 1 | 1 | 1 | 1 | 1 | 1 |
|---|---|---|---|---|---|---|
| 1 | 1 | 1 | 1 | 1 | 1 | 1 |
| 1 | 1 | 1 | 3 | 1 | 1 | 1 |
| 1 | 1 | 3 | 4 | 3 | 1 | 1 |
| 1 | 1 | 1 | 3 | 1 | 1 | 1 |
| 1 | 1 | 1 | 1 | 1 | 1 | 1 |
| 1 | 1 | 1 | 1 | 1 | 1 | 1 |

FIG. 21

| u | u | u | u | u | u | u |
|---|---|---|---|---|---|---|
| u | 0 | 0 | −4 | 0 | 0 | u |
| u | 0 | −8 | 10 | −8 | 0 | u |
| u | −4 | 10 | 8 | 10 | −4 | u |
| u | 0 | −8 | 10 | −8 | 0 | u |
| u | 0 | 0 | −4 | 0 | 0 | u |
| u | u | u | u | u | u | u |

FIG. 22

| 0 | 0 | 0 | 0 | 0 | 0 | 0 |
|---|---|---|---|---|---|---|
| 0 | 0 | 0 | 0 | 0 | 0 | 0 |
| 0 | 0 | 0 | 1 | 0 | 0 | 0 |
| 0 | 0 | 1 | 1 | 1 | 0 | 0 |
| 0 | 0 | 0 | 1 | 0 | 0 | 0 |
| 0 | 0 | 0 | 0 | 0 | 0 | 0 |
| 0 | 0 | 0 | 0 | 0 | 0 | 0 |

FIG. 23

| -1 | -2 | -2 | -2 | -1 |
|----|----|----|----|----|
| -2 | 2  | 2  | 2  | -2 |
| -2 | 2  | 6  | 2  | -2 |
| -2 | 2  | 2  | 2  | -2 |
| -1 | -2 | -2 | -2 | -1 |

INJECTION CONTROL SYSTEM OF FLOCCULATING AGENT

BACKGROUND OF THE INVENTION

The present invention relates to an injection control system of a flocculating agent for forming flocs by flocculating a suspended substance in a water purifying plant, sewage treatment plant, and industrial sewer treatment plant and, more particularly, to a system for highly accurately recognizing an image of flocs to thereby accurately control the injection thereof.

In the water purifying plant, a flocculating agent is added into the collected raw water, a suspended substance is flocculated, a coagulated matter (hereinafter, referred to as flocs) is formed, and these flocs are precipitated and removed. Practically speaking, after the flocculating agent was injected into the high speed admixture pool, the raw water is led into the floc forming pool and slowly stirred, thereby forming flocs. The raw water drains out of the floc forming pool ad is led into the precipitation pool. The flocs are precipitated in this pool to thereby remove the suspended substance. The particulates which were not precipitated in the precipitation pool are removed in the filter bed.

In execution of the water treatment as mentioned above, if no floc is formed in the floc forming pool, the filter bed will be sooner or later choked. It is known that an injection amount of the flocculating agent is controlled to preferably form flocs. Hitherto, as disclosed in JP-B 59-29281, for example, the injection amount of the flocculating agent is controlled on the basis of the turbidity of the raw water and the diameter and surface area of the suspended substance.

On the other hand, for example, as shown in JP-A-54-143296, a method whereby the shape and size of floc are monitored by the image processes has been proposed. Practically speaking, on the basis of the floc image photographed by an industrial camera or the like, the portion (pixel) which is brighter than a predetermined brightness (threshold value) is set to the "1" level and this portion is recognized as a floc. On the contrary, the portion (pixel) which is darker than the predetermined value is set to the "0" level and this portion is recognized as a matter other than the floc. In this manner, the floc image is binarized and image processed, thereby monitoring the floc forming situation.

In the case where the injection amount of the flocculating agent was merely controlled on the basis of the turbidity of the raw water and the diameter and surface area of the suspended substance as in the foregoing conventional technique, the formation of flocs is influenced by the temperature, turbidity, diameter, pH, alkalinity, and the like, so that the flocs cannot be always preferably formed. In other words, since the flocculating agent is injected without directly measuring the floc forming state, the floc formation cannot be always preferably maintained. On the other hand, the idea such that flocs are recognized as images is well known. However, nothing is known with respect to how to evaluate the state of the floc formation from the recognized floc image and how to control the injection amount of the flocculating agent in order to preferably form flocs. Therefore, it is difficult to desirably control the floc formation on the basis of the floc image recognized.

On the other hand, according to the conventional technique, the portion of the floc image which is brighter than the threshold value is regarded as a floc. On the contrary, the portion which is darker than the threshold value is regarded as a background. In this manner, the binarization is performed. In this case, although the bright floc can be binarized even if the threshold value is set to a high value, the dark floc is regarded as a background because its brightness is below the threshold value. On the contrary, when the threshold value is set to a low value, although the dark floc can be also binarized, the noise existing in the background is also binarized as a flock. In addition, when the threshold value is set to a low value, the background portion around the bright floc is regarded as a part of the floc. Thus, this floc is binarized larger than the actual size or separate flocs existing closely are binarized as one floc. As described above, the conventional technique has a problem such that the floc cannot be accurately binarized.

SUMMARY OF THE INVENTION

To solve the foregoing problems in the conventional technique, it is an object of the present invention to calculate a characteristic amount of a diameter distribution from the result of the recognition of a floc image and thereby to control an injection amount of a flocculating agent on the basis of the characteristic amount. Practically speaking, when the mean value of the floc diameters calculated on the assumption of a log-normal distribution is small, the injection amount of the flocculating agent is increased and on the contrary, if the diameter is large, the injection amount of the flocculating agent is decreased.

The floc diameter distribution in the floc forming pool is adapted to the log-normal distribution. The log-normal distribution is expressed as two variables of a mean value and a standard deviation. As the result of the experiments, the standard deviation was constant to a change in injection amount of the flocculating agent, but the mean value increased with an increase in injection amount of the flocculating agent. Therefore, the formation of flocs can be controlled by operating the injection amount of the flocculating agent using the mean value of the log-normal distribution as an index.

Another object of the invention is to provide an image recognizing system of flocs in which flocs and the background can be clearly distinguished and recognized and the flocs can be accurately detected.

After the luminance gradient of the floc portion of the photographed floc image is emphasized or enhanced by a luminance gradient emphasizing means, it is compared with a threshold value and binarized. Thus, the boundary between the flocs and the background can be clarified. This method is based on a discovery as the result of experimentation by the inventors of the present invention that the luminance levels of the flocs differ.

Since a change in brightness of the background is very small, the brightness of the background portion is set to a value near the "0" level and at the same time, the luminance gradient of the portion whose brightness changes is emphasized or enhanced, thereby enabling the boundary between the light and dark portions to be clarified. Accordingly, by further brightening the brightness of the small dark floc, the floc can be more easily recognized and at the same time, the boundary between the large floc and the background can be clarified.

BRIEF DESCRIPTION OF THE DRAWINGS

FIG. 10 is a table showing luminances of light and dark images;

FIGS. 11 to 18 are tables for explaining the calculations of a spatial filtering;

FIGS. 19 to 26 are diagrams and tables for explaining the calculations and operations of the spatial filtering;

DESCRIPTION OF THE PREFERRED EMBODIMENTS

Figure 1:
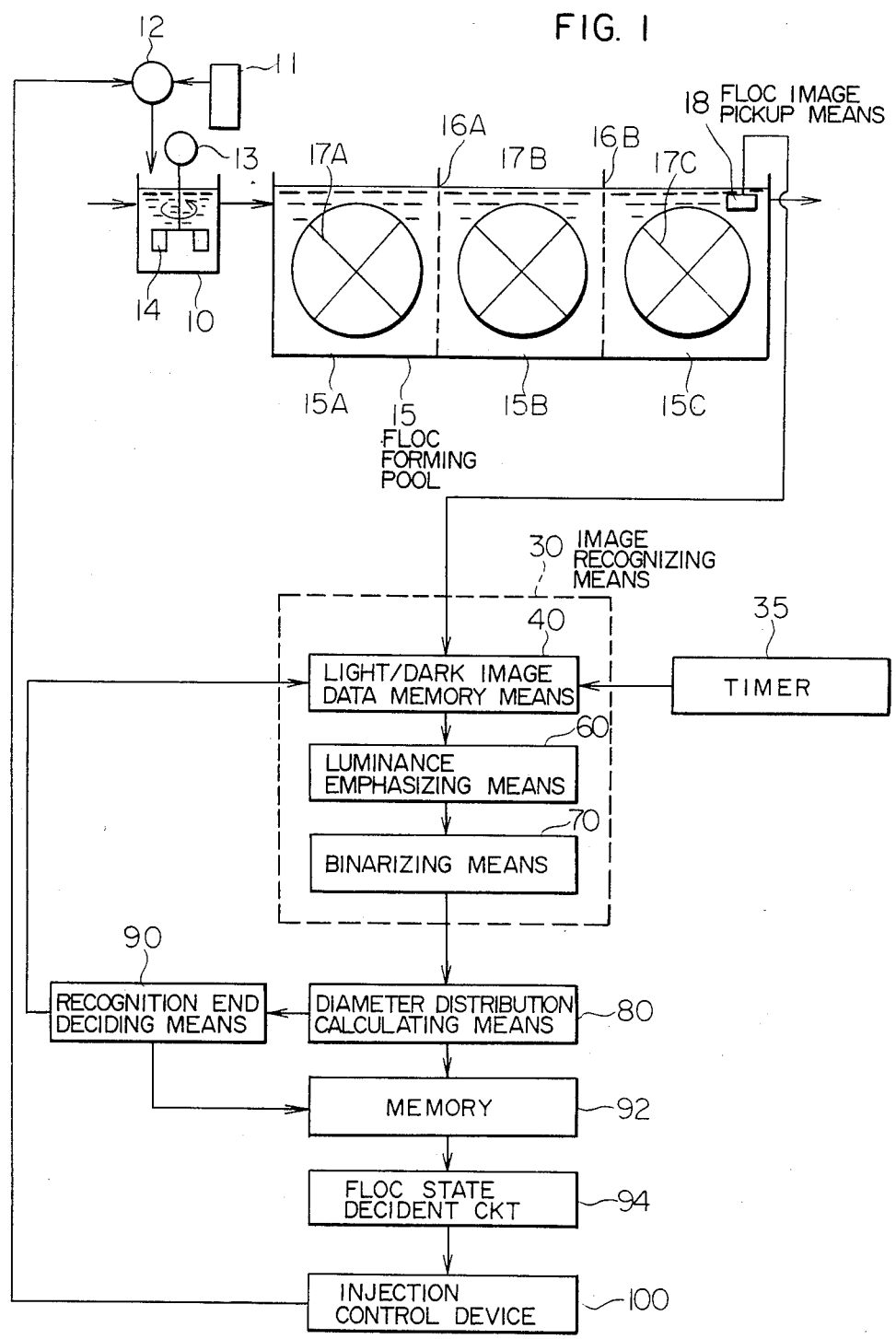
FIG. 1 is a schematic view showing the outline of a water treatment process including a flocculation basin and its control apparatus in accordance with one embodiment of the present invention.

FIG. 1 shows an embodiment of the present invention.

In FIG. 1, the raw water flows into a high speed admixture pool 10. A liquid high molecular coagulant (polyaluminum chloride), or an inorganic coagulant such as aluminum sulfate, or the like stored in a flocculating agent tank 11 is injected by a flocculating agent injection pump 12. On the other hand, an alkali agent such as calcium hydroxide, sodium carbonate, or the like is also injected in order to promote the formation of flocs. The raw water in the admixture pool 10 is stirred by a stirring wing 14. The stirring wing 14 is driven by a stirrer 13. The water injected with the flocculating agent and stirred is led into a flocculating pool (hereinafter, referred to as "floc forming pool") 15. The floc forming pool 15 is constituted by three pools 15A, 15B and 15C which are partitioned by flow adjusting walls 16A and 16B having a plurality of holes. Stirring paddles 17A, 17B and 17C are provided in the pools 15A, 15B, and 15C, respectively. Each of the stirring paddles 17A to 17C is slowly rotated at a speed of about 1 to 10 r.p.m. (paddle peripheral speed=0.15 to 0.8 m/sec).

A floc image pickup means 18 such as an underwater camera or the like is attached in the pool 15C on the last downstream side of the floc forming pool 15. The light/dark image signal (analog signal) of the flocs photographed by the floc image pickup means 18 is input to image recognizing means 30. The image pickup means 18 may be also attached in the first pool 15A without being limited to the last pool 15C. The image recognizing means 30 comprises: a timer 35 to instruct the image process on a predetermined time unit basis; light/dark image memory means 40; luminance emphasizing means 60; and binarizing means 70. The floc image pickup means 18 will be explained in detail hereinafter. The image signal binarized by the binarizing means 70 is input to diameter distribution calculating means 80. The calculating means 80 calculates a diameter distribution of the flocs on the basis of the binarized image signal and stores the result of the calculation into a volume concentration distribution memory 92. Recognition end deciding means 90 discriminates whether the number of recognized floc images has reached a predetermined value or not. When the number of recognized floc images is below the predetermined value, the deciding means 90 instructs the image memory means 40 so as to store the light/dark images photographed by the image pickup means 18. If the deciding means 90 determines that the number of recognized images has reached the predetermined value (e.g., ten), the volume concentration distribution stored in the memory 92 is input to a flocculation state deciding circuit 94. The deciding circuit 94 obtains the geometric mean diameter of the flocs from the volume concentration distribution and adds to an injection control device 100. The injection control device 100 obtains the injection amount of the flocculating agent on the basis of the geometric mean diameter and controls the injection pump 12.

Figure 2:
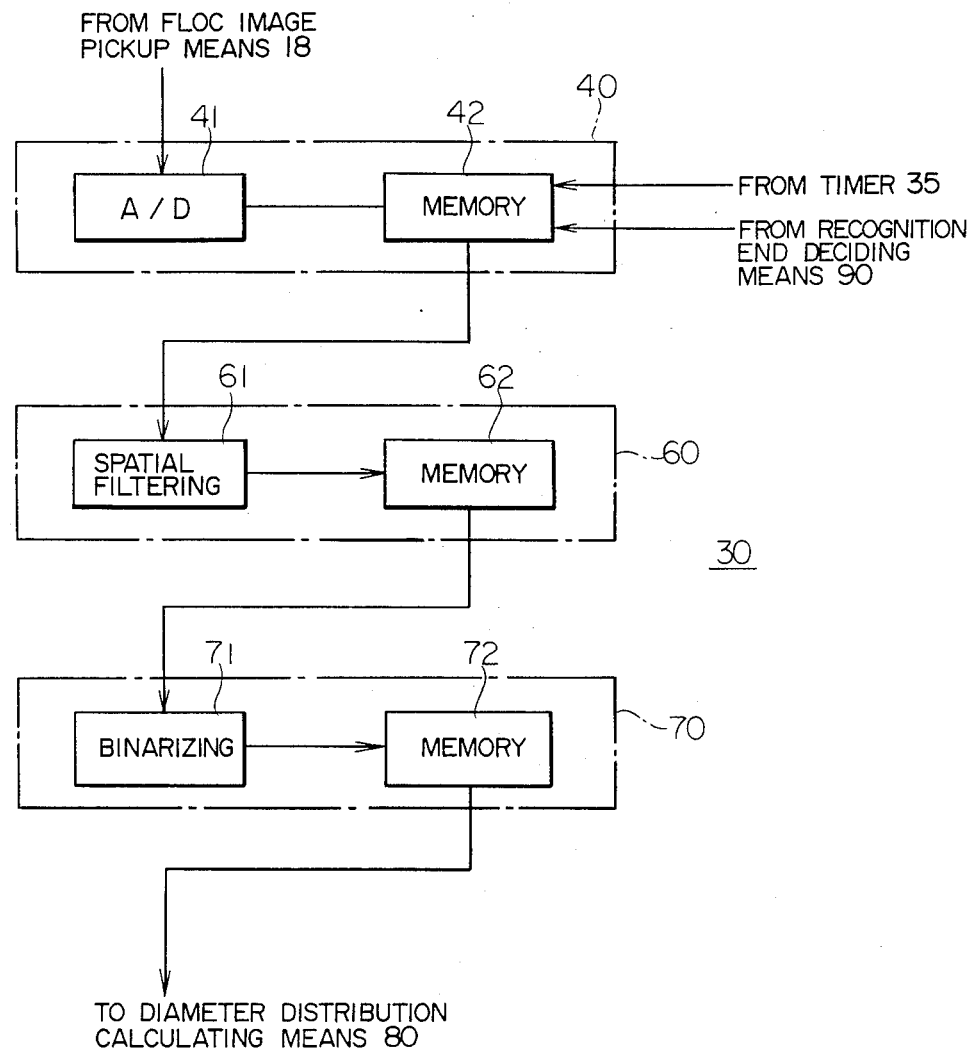
FIG. 2 is a block diagram showing an example of image recognizing means.

FIG. 2 shows a constitution of an example of the image recognizing means.

In FIG. 2, the light/dark image memory means 40 consists of an A/D converter 41 and a light/dark original image memory 42. The A/D converter 41 converts the analog light/dark image data obtained from the image pickup means 18 into the digital value and stores into the memory 42. The memory 42 stores the original image signal in response to storage commands from the timer 35 and deciding means 90. The memory 42 transfers the floc light/dark image data stored to a spatial filtering circuit 61. The luminance emphasizing means 60 comprises the spatial filtering circuit 61 and a filtering light/dark image memory 62. Its function is to make large a luminance difference between the floc and the background and thus enhance the clarity of the boundary between the floc and the background. In response to the image signal from the memory 42, the spatial filtering circuit 61 executes the arithmetic operation of the spatial filtering and stores the result into the memory 62. The stored filtering light/dark image is input to a binarizing circuit 71. The binarizing means 70 consists of the binarizing circuit 71 and a binarization memory 72. When the binarizing circuit 71 receives the filtering light/dark image from the memory 62, it binarizes this image and stores the result of the binarization into the binarization memory 72.

Figure 3:
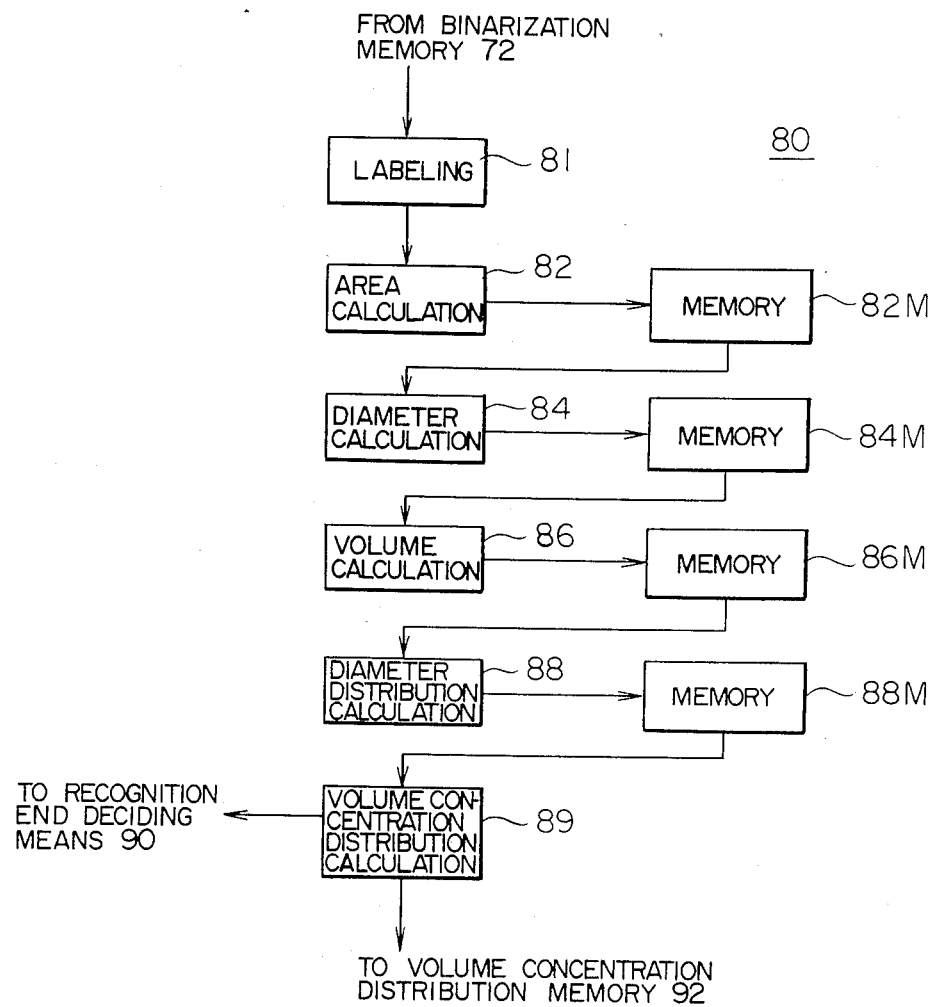
FIG. 3 is a block diagram showing an example of a diameter distribution calculating means.

FIG. 3 shows a constitution of an example of the diameter distribution calculating means 80.

A labeling circuit 81 receives an image signal B from the binarization memory 72 and adds the number to each floc. An area calculating circuit 82 calculates the area of each floc every number and stores the result of the calculation into an area memory 82M. A diameter calculating circuit 84 calculates the diameter from the area of the floc and stores the result of the calculation into a diameter memory 84M. A volume calculating circuit 86 calculates the volume of each floc and stores the result of the calculation into a volume memory 86M. A diameter distribution calculating circuit 88 receives the floc diameters from the volume memory 86M, calculates the diameter distribution of the flocs, and stores into a diameter distribution memory 88M. A volume concentration distribution calculating circuit 89 calculates the volume concentration distribution from the values stored in the diameter distribution memory 88M. After completion of the calculation, the calculating circuit 89 supplies the end signal to the recognition end deciding means 90 and also stores the calculated volume concentration distribution into the volume concentration distribution memory 92.

Figure 4:
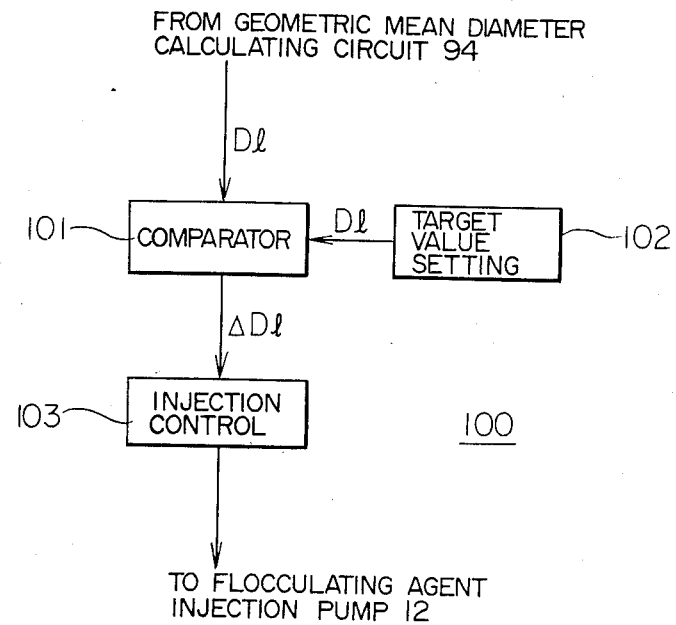
FIG. 4 is a block diagram showing an example of a control device.

FIG. 4 shows a constitution of an exanple of the injection control device 100. The control device 100 comprises a comparator 101, a target value setting device 102, and an injection control circuit 103.

The operation will now be explained.

The raw water is led from the river, lake, or marsh (not shown) into a sand precipitation pond (not shown) and the sands and large particles are precipitated and removed from the raw water in this pond. Thereafter, the raw water flows into the high speed admixture pool 10. The particulates having diameters of about 1 to 10 $\mu$m are contained in the raw water flowing into the pool 10 so as to have a concentration of 2 to 200 mg/l. A high molecular coagulant (polyaluminum chloride) or an inorganic coagulant such as aluminum sulfate or the like stored in the flocculating agent tank 11 is supplied into the raw water in the pool 10 by the injection pump 12. The raw water in the pool 10 is stirred by the stirring wing 14, so that the flocculating agent is dispersed into the raw water. The suspended particulates are the negative colloid such that the surface of each particulate is negatively charged. Numberless suspended particulates are mutually coupled (flocculated) by the flocculating agent having the positive charges. The residence time in the pool 10 is one to five minutes. The suspended particulates are flocculated for this residence time, so that microflocs (nuclei of flocs) having diameters of 10 to 100 $\mu$m are formed. The mixture liquid containing the microflocs is led into the floc forming pool 15 and sequentially flows through the three pools 15A, 15B, and 15C. The flow adjusting walls 16A and 16B prevent that the mixture liquid flows out from the outlet by shortcircuiting the regions near the water surface without being sufficiently mixed in the floc forming pool 15. Each residence time of the pools 15A to 15C is 5 to 15 minutes (the total residence time is 15 to 45 minutes). The raw waters in the pools 15A to 15C are slowly stirred by the stirring paddles 17A to 17C. A sufficient amount of flocculating agent is supplied into the pool 10, so that the flocculating agent is adhered onto the surface of each microfloc. Therefore, the microflocs in the floc forming pool 15 collide or are come into contact with each other by the stirring and are flocculated. While the raw water remains and is stirred in the floc forming pool 15 for 15 to 45 minutes, the microflocs are grown so as to become the flocs having diameters of 100 to 5000 $\mu$m. The state of flocs or degree of floc formation in the pool 15C is photographed by the floc image pickup means 18. The light/dark image signal of the flocs obtained from the image pickup means 18 is input to the A/D converter 41 of the image recognizing means 30. The A/D converter 41 always converts the light/dark image signal into the digital signal and input to the memory 42. If the A/D converter 41 converts the analog image signal into the digital signal of seven bits, the luminance of each pixel is digitized into 128 levels. The case where a picture plane consists of 256 pixels of eight bits in each of the lateral and vertical directions will now be explained as an example hereinbelow in this embodiment. The memory 42 has storage areas corresponding to the pixels of 256×256. Assuming that the pixels of i rows are arranged in the horizontal direction and the pixels of j columns are arranged in the vertical direction, the values of $g_0(i,j)$ (where, $i=1$ to 256 and $j=1$ to 256) of the brightness (luminance) of the picture plane are stored into the respective storage areas of i rows and j columns in the light/dark original image memory 42.

The luminance value $g_0(i,j)$ of each pixel is digitized into 128 levels. The light/dark image data stored in the memory 42 is supplied to the spatial filtering circuit 61. The circuit 61 receives the image signal from the memory 42 and emphasizes the luminance gradient between the flocs and the background. The result of the calculation of the spatial filtering circuit 61 is stored into the memory 62. The memory 62 has memory storage areas corresponding to the pixels of 256×256. Since the spatial filtering method is well known, its detailed description is omitted. However, briefly speaking, the luminance $g_0(i,j)$ of each pixel of the light/dark image and the load product sum matrix $F=f(i,j)$ of the spatial filtering are respetively multiplied and all of the results of the multiplication are further added. When the load product sum matrix F consists of three rows and three columns, the luminance $g^*(i,j)$ can be expressed by the following equation.

$$g^*(i,j) = \sum_{k=-1}^{1} \left( \sum_{l=-1}^{1} g_0(2+k, 2+l) \times f(2+k, 2+l) \right) / S \quad (1)$$

where, S is a scaling coefficient and is selected such that the result of the calculation does not become a value above, e.g., 128. k and l are symbols to change the elements of the array.

By calculating the equation (1) with respect to $i=2$ to 255 and $j=2$ to 255 until the luminance $g^*(255, 255)$ of the pixel of the 255th row and the 255th column is obtained, all of the calculations of one picture plane are finished. The calculation of the spatial filtering is not executed with regard to all of the pixels of the first and 256th rows and all of the pixels of the first and 256th columns. In this manner, the spatial filtering circuit 61 executes the calculations. The luminances as the results of the calculations are stored into the memory 62. The light/dark image signal whose luminance gradient was emphasized by the spatial filtering method as described above is input to the binarizing circuit 71. The binarizing circuit 71 receives the filtering light/dark image $g^*(i,j)$ stored in the filtering light/dark image memory 62 and binarizes it. Namely, assuming that the threshold value of binarization is $L_t$, the pixel whose level is above $L_t$ is set to the "1" level. On the contrary, the pixel whose level is lower than $L_t$ is set to the "0" level. The binarized signal having the value of eigher the "0" level or the "1" level is set to $b(i,j)$. The binarizing circuit 71 executes the calculation of either one of the following equations (2) and (3).

If $g^*(i,j) \geq L_t : b(i,j) = 1$ (2)

If $g^*(i,j) < L_t : b(i,j) = 0$    (3)

Therefore, on the basis of the light/dark luminance $g^*(i,j)$ as the result of the spatial filtering, the pixel having the luminance above the threshold value $L_t$ is recognized as a pixel corresponding to the floc and is set to the "1" level. On the contrary, the portion having the luminance lower than the threshold value $L_t$ is recognized as a pixel other than the floc and is set to the "0" level. Consequently, a set of pixels which are represented by the "1" level are recognized as flocs. Assuming that the whole image constituted by the result $b(i,j)$ of the binarization is B, this image B is stored into the binarization memory 72. The image B is input to the diameter distribution calculating means 80 as shown in FIG. 1 and the floc diameter distribution is calculated.

The calculating means 80 obtains the diameter distribution in the following manner.

Figure 5:
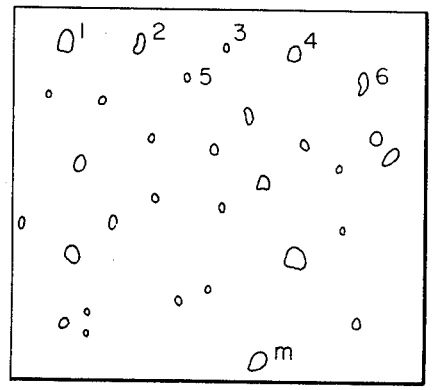
FIG. 5 is an explanatory diagram of a labeling.

First, as shown in FIG. 5, the labeling circuit 81 adds the number to each of the flocs existing in the image B such as 1, 2, 3, ..., m (m denotes the total number of flocs). The area calculating circuit 82 calculates the areas of flocs every labeled number by the following equation.

$$A = k_1 \cdot A_p \quad (4)$$

where, A is a projection area (the unit is mm$^2$) of the floc, $A_p$ is the number of pixels of each floc (the unit is pixel), and $k_1$ is a conversion constant (the unit is mm/pixel). "pixel" is the unit indicative of the pixel. The calculation of the equation (4) is executed with respect to each floc numbered by the labeling circuit 81. The result is stored into the area memory 82M. The diameter calculating circuit 84 calculates the diameter d of each floc by the following equation by assuming a circle having the same area as that of the floc.

$$d = \sqrt{4A/\pi} \quad (5)$$

The diameter d is calculated with regard to each area and the result is stored into the diameter memory 84M. The volume calculating circuit 86 receives the diameters of the respective flocs from the diameter memory 84M and calculates the volume v of each floc by the following equation.

$$v = \pi d^3/6 \quad (6)$$

The result of the calculation of the volume for the diameter is stored into the volume memory 86M. The diameter distribution calculating circuit 88 receives the volume v of each floc from the volume memory 86M and determines to which grade the diameter of each floc belongs. Then, the calculating circuit 88 adds the volume of each floc into the relevant storage area in the diameter distribution memory 88M. Assuming that the grade width of the diameter is 0.1 mm, the grade is divided into, e.g., the following fifty-one grades. Therefore, the memory 88M also has 51 storage areas.

$D_1$: 0 to 0.1 mm
$D_2$: 0.1 to 0.2 mm
$D_3$: 0.2 to 0.3 mm
.
.
.
$D_{50}$: 4.9 to 5.0 mm
$D_{51}$: 5.0 mm ...

For example, assuming that the diameter of a certain floc is 0.25 mm, the volume is 0.00818 mm$^3$ from the equation (6). Assuming that the volume of the floc having the diameter of $D_i$ is $v_i$, the volume data of 0.00818 is stored into the storage area corresponding to the diameter $D_3$ of the diameter distribution memory 88M. While the grade of the diameter of each floc is determined, the results of the decisions are sequentially added into the respective areas in the memory 88M, thereby obtaining the diameter distribution of the flocs.

The volume concentration distribution calculating circuit 89 calculates the volume concentration distribution $V_i'$ of the flocs (the distribution indicative of the volume $V_i$ of the floc having the diameter $D_i$ in the unit volume) on the basis of the volume value $V_i$ stored in the memory 88M in accordance with the following equation.

$$V_i' = V_i/(N \cdot V_w) \quad (7)$$

where, N denotes the number of recognition times (the number of processing images) and $V_w$ represents the volume photographed in one picture plane.

Figure 6:
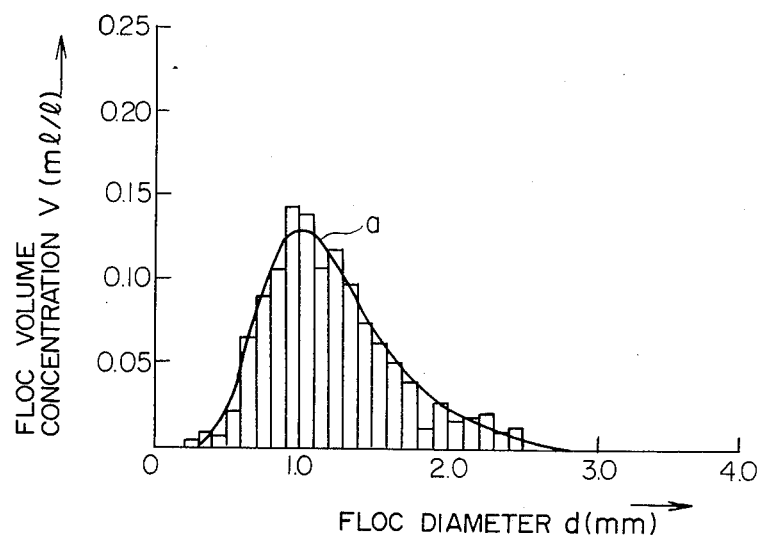
FIG. 6 is a characteristic diagram of a floc volume concentration and a diameter.

FIG. 6 shows an example of the resultant volume concentration distribution (axis of ordinate shows the diameter $D_i$ and an axis of abscissa denotes the volume concentration $V_i'$). A curve a in FIG. 6 in a theoretical curve of the log-normal distribution obtained from the histogram of the volume concentration distribution of FIG. 6. Each time the diameter distribution calculating means 80 finishes the calculation of the volume concentration distribution every picture plane as described above, the recognition end deciding means 90 discriminates whether the recognition of the image of the flocs has been finished or not with respect to N picture planes. If the number of recognition times is smaller than N, the image photographed by the floc image pickup means 18 at that time is stored into the memory means 40 and the foregoing floc image processes are repeated. If the number of recognition times has reached N, the value of the volume concentration distribution calculated by the equation (7) is stored into the volume concentration distribution memory 92.

The example in which the volume concentration distribution is calculated for every recognition picture plane has been described above. However, the calculation of the equation (7) may be also executed after completion of the recognition of a predetermined number of times.

The flocculation state deciding circuit 94 calculates the geometric mean diameter $D_l$ of the floc diameter distribution from the values in the memory 92 on the basis of the following equation.

$$D_l = \sum_{i=1}^{51} V_i \cdot \log D_i / \sum_{i=1}^{51} V_i \qquad (8)$$

The geometric mean diameter $D_l$ obtained by the deciding circuit 94 is input to the injection control device 100. The geometric mean diameter $D_l$ output from the deciding circuit 94 is input to the comparator 101. The comparator 101 calculates the deviation $\Delta D_l$ between the target value $D^*_l$ of the geometric mean diameter which is set by the target value setting device 102 and the calculated value $D_l$ in accordance with the following equation.

$$\Delta D_l = D_l - D^*_l \qquad (9)$$

Figure 7:
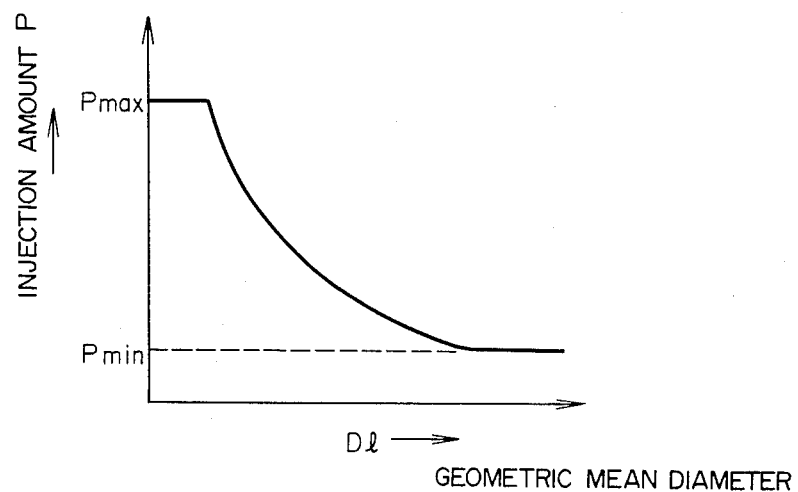
FIG. 7 is a characteristic diagram of the injection of a flocculating agent.

The injection control circuit 103 operates the injection pump 12 on the basis of the deviation $\Delta D_l$ and controls the injection amount of the flocculating agent. Practically speaking, when the deviation $\Delta D_l$ has a negative value, the injection amount of the flocculating agent is increased. On the contrary, when the deviation $\Delta D_l$ has a positive value, the injection amount of the flocculating agent is decreased. There is such a characteristic relation as shown in FIG. 7 between the geometric mean diameter $D_l$ and the injection amount P of the flocculating agent. The abnormal injection of the flocculating agent is prevented by setting the maximum injection amount $P_{max}$ and the minimum injection amount $P_{min}$ for the injection amount of the flocculating agent.

In this manner, the injection amount of the flocculating agent is controlled. In this case, since the injection amount of the flocculating agent is controlled by the geometric mean diameter of the flocs, the flocs can be preferably formed. The reason why the floc formation can be desirably executed will now be explained hereinbelow with reference to FIGS. 8 and 9.

Figure 8:
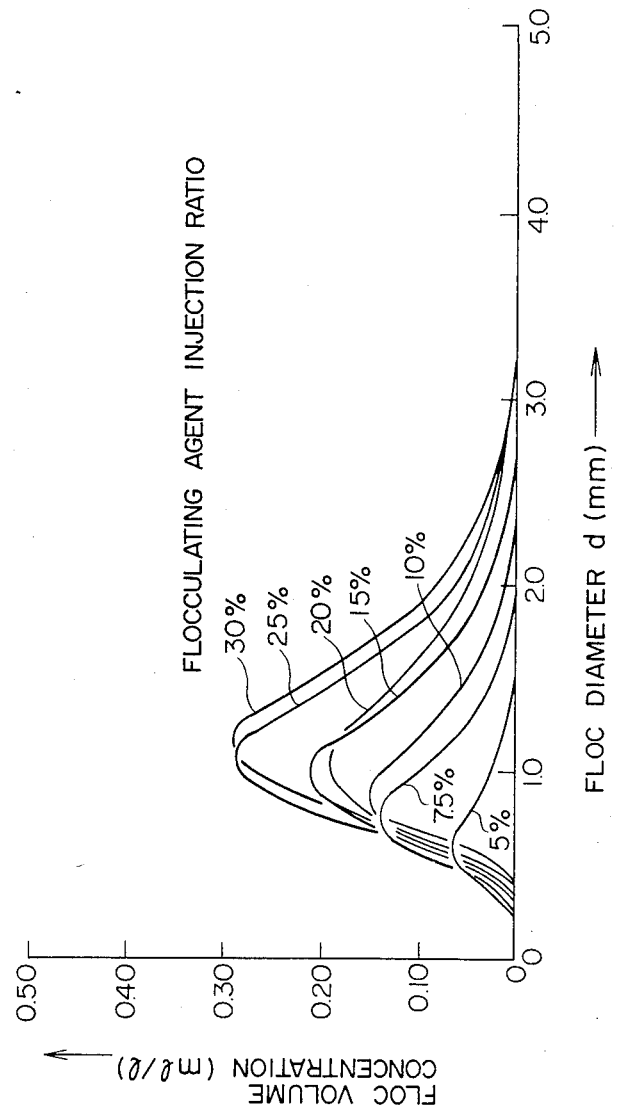
FIGS. 8 and 9 are characteristic diagrams based on the actual measured values for explaining effects of the invention.

FIG. 8 shows a characteristic diagram based on the actual measured values of a change in floc volume concentration distribution in association with a change in injection ratio of the flocculating agent.

Figure 9:
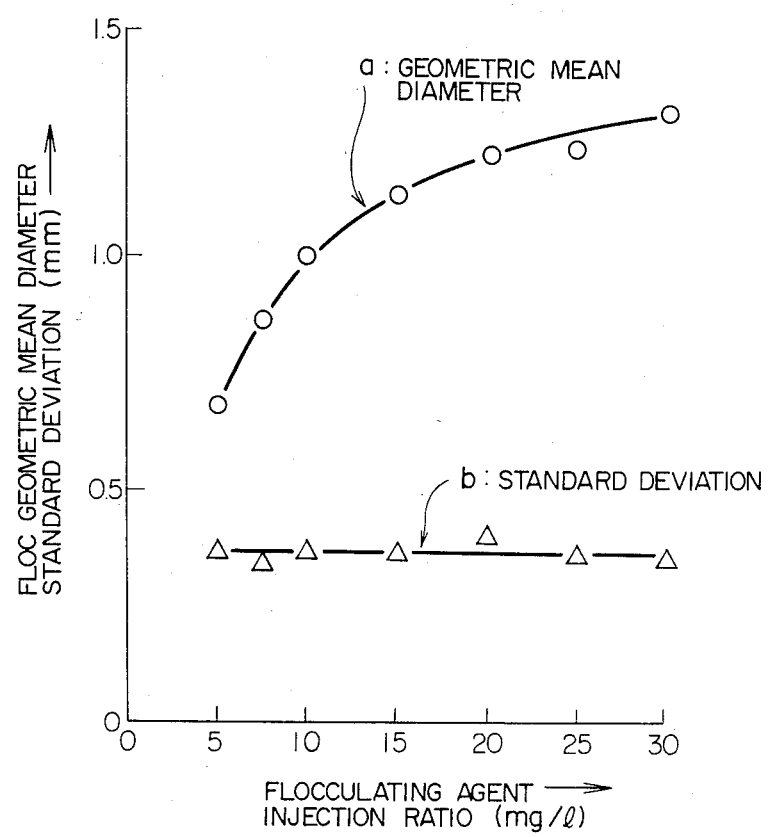

FIG. 8 shows the actual measured values of the floc volume concentration distribution when the flocculating agent injection ratio was changed from 5 mg/l to 30 mg/l. As will be obvious from FIG. 8, when the injection ratio increases, the diameter and the distribution peak also increase. This means that a large quantity of large flocs were formed with an increase in injection ratio. Next, the change in floc volume concentration distribution to the change in flocculating agent injection ratio was actually measured. Practically speaking, the geometric mean diameter and the standard deviation were calculated from the actual measured values shown in FIG. 8. Then, the geometric mean diameter and the standard deviation to the change in injection ratio were obtained. The results are as shown in FIG. 9. The standard deviation shown as a characteristic b in FIG. 9 represents the index indicative of the degree of extent of the distribution. As will be obvious from FIG. 9, the geometric mean diameter of the characteristic a increases with an increase in injection ratio, but the standard deviation of the characteristic b is constant. Therefore, by changing the flocculating agent injection ratio, only the geometric mean diameter is varied. Accordingly, by measuring the geometric mean diameter by an image and changing the flocculating agent injection ratio such that the value of the measured geometric mean diameter becomes the target value as in the present invention, the flocs can be always certainly formed.

In this embodiment, after the luminance gradient of the floc image was emphasized using the load product sum matrix in the spatial filtering circuit 61, it is binarized. Therefore, the flocs can be also recognized by clearly distinguishing the flocs from the background.

As described above, the diameter distribution of the flocs is measured by recognizing the image of flocs and the geometric mean diameter is derived. The increase or decrease of the injection amount of the flocculating agent is controlled in accordance with the geometric mean diameter. Therefore, since the flocculating agent injection amount is controlled while directly discriminating the state of the actual floc formation, the flocs can be certainly stably formed.

The present invention can be applied to the flocculating agent injection control in the flocculating process in a plant other than the water purifying plant. For example, in the sewage treatment plant, the invention can be also applied to the process to improve the precipitation efficiency be injecting the flocculating agent into the active sludge, the refining process in the sludge process by injecting the flocculating agent, the pelletizing process of dust coal, and the like.

In the foregoing embodiment of the invention, the case where the picture plane consists of 256 pixels of eight bits in each of the lateral and vertical directions has been described. In FIG. 10, assuming that the pixels of i rows are arranged in the horizontal direction and the pixels of j columns are arranged in the vertical direction, the values $g_0(i,j)$ (where, $i=1$ to 256 and $j=1$ to 256) of the brightness (luminance) of the picture plane are stored into the respective storage areas of i rows and j columns in the light/dark original image memory 42. The luminance $g_0(i,j)$ of each pixel is digitized into 128 levels. The light/dark image data stored in the memory 42 is supplied to the spatial filtering circuit 61. The spatial filtering circuit 61 receives the image signal from the memory 42 and emphasizes the luminance gradient between the flocs and the background. The result of the calculation of the spatial filtering circuit 61 is stored into the memory 62. The memory 62 has the storage areas as many as the pixels of 256×256.

The operation of the spatial filtering circuit 61 will now be explained in detail.

It is assumed that a local image area which is subjected to the spatial filtering process is an area of n×n consisting of n pixels in each of the horizontal and vertical directions. When n=3, the local image area consists of three pixels in each of the horizontal and vertical directions. FIG. 11 shows a local image area of 3×3. On the other hand, a load coefficient matrix of the spatial filtering is similarly defined by the area of n×n consisting of n pixels in each of the X and Y directions. When n=3, the load coefficient matrix is the matrix of 3×3. It is assumed that the load product sum matrix (load coefficient matrix) of this spatial filtering is F. FIG. 12 shows a load product sum matrix F of 3×3. As shown in the following equation (10), the luminances $g_0(i,j)$ of each pixel of the light/dark image and the load product sum matrices $f(i,j)$ of the spatial filtering are respectively multiplied and all of the results of the multiplications are further added, thereby calculating the spatial filtering.

As shown in FIG. 15, the result g*(2,2) of the calculation of the spatial filtering is stored into the area in the memory 62 corresponding to the central pixel.

$$g^*(2, 2) = [g_0(1, 1) \times f(1, 1) \quad (10)$$
$$+ g_0(1, 2) \times f(1, 2)$$
$$+ g_0(1, 3) \times f(1, 3)$$
$$+ g_0(2, 1) \times f(2, 1)$$
$$+ g_0(2, 2) \times f(2, 2)$$
$$+ g_0(2, 3) \times f(2, 3)$$
$$+ g_0(3, 1) \times f(3, 1)$$
$$+ g_0(3, 2) \times f(3, 2)$$
$$+ g_0(3, 3) \times f(3, 3)]/S$$

where, S is a coefficient of the scaling. The coefficient S is set to a value within 127 such that the result of the calculation does not become a value above 128.

The equation (10) will be summarized by the following equation.

$$\therefore g^*(2,2) = \quad (11)$$

$$\sum_{k=-1}^{1} \left( \sum_{l=-1}^{1} g_0(2 + k, 2 + l) \times f(2 + k, 2 + l) \right)/S$$

where, k and l are symbols to change the array elements.

After completion of the calculation of the pixel g*(2,2), the value of g*(2,3) which is adjacent by only one pixel is then calculated as shown in FIG. 13. At this time, as shown in FIG. 14, the local image area of 3×3 such that the value $g_0(2,3)$ is located at the center is calculated. In a manner similar to the equation (10), g*(2,3) is calculated. As described above, the calculation is executed in the column (horizontal) direction while sequentially shifting one pixel by one. After completion of the calculations of one column, the similar calculations are also subsequently executed with respect to the second row. The calculating equation of the pixels of the ith row and the jth column is as follows.

$$\therefore g^*(i, j) = [g_0(i - 1, j - 1) \times f(1, 1) \quad (12)$$
$$+ g_0(i - 1, j) \times f(1, 2)$$
$$+ g_0(i - 1, j + 1) \times f(1, 3)$$
$$+ g_0(i, j - 1) \times f(2, 1)$$
$$+ g_0(i, j) \times f(2, 2)$$
$$+ g_0(i, j + 1) \times f(2, 3)$$
$$+ g_0(i + 1, j - 1) \times f(3, 1)$$
$$+ g_0(i + 1, j) \times f(3, 2)$$
$$+ g_0(i + 1, j + 1) \times f(3, 3)]/S$$

$$\therefore g^*(i, j) = \quad (13)$$

$$\sum_{k=-1}^{1} \left( \sum_{l=-1}^{1} g_0(i + k, j + l) \times f(2 + k, 2 + l) \right)/S$$

The above equations (10) and (12) are calculated with respect to i=2 to 255 and j=2 to 255 until the luminance g*(255, 255) of the pixel of the 255th row and the 255th column is derived. After all of the calculations were finished, the calculations of one picture plane is completed. The spatial filtering is not calculated with respect to all of the pixels of the first and 256th rows and all of the pixels of the first and 256th columns.

In this manner, the spatial filtering circuit 61 calculates the equations (10) and (12). The luminances as the results of the calculations are stored into the memory 62.

The load coefficient f(i,j) as an important factor in execution of the spatial filtering will be explained. FIG. 15 shows an example of the load product sum matrix F when n=3 in the load product sum matrix F of the spatial filtering having the load coefficient f(i,j) as an element. The operation of this example will now be explained with respect to the case of a light/dark image whose luminance $g_0(i,j)$ is as shown in FIG. 16. A square block in FIG. 16 represents a pixel and the numerical value written in the block indicates the luminance of the pixel. FIG. 16 shows the state in which there is a floc having the luminance 3 and the size of one pixel in the background of the luminance 1. In this case, the luminance difference between the background and the floc is equal to two levels. When the equation (12) is calculated using the load product sum matrix F shown in FIG. 15 for the image of FIG. 16, the result of the calculation will be as shown in FIG. 17. In the calculation, S is set to 1 and the values of the luminances of the pixels indicated by u and arranged in the peripheral portion in FIG. 17 cannot be calculated; therefore, the value of u is set to 0.

As will be obvious from FIG. 17, since the luminance of the floc is increased to 16, the brightness of the floc is emphasized. However, the luminances of the pixels around the floc are 0 or −4. Therefore, the luminance difference between the background and the floc is 16 or more. Accordingly, it will be appreciated that the floc becomes further brighter than the background.

The spatial filtering circuit 61 (FIG. 2) executes the calculation as described above and the luminance as the result of the calculation is stored into the image memory 62.

The light/dark image signal whose luminance gradient was emphasized by the spatial filtering process as explained above is input to the binarizing circuit 71. The binarizing circuit 71 receives the filtering light/dark image g*(i,j) stored in the memory 62 and binarizes this image. Namely, assuming that the binarization threshold value is $L_t$, when the luminance value of the pixel is above $L_t$, this pixel is set to the "1" level. On the contrary, if it is lower than $L_t$, this pixel is set to the "0" level. The binarized signal having either the "0" level or the "1" level assumes b(i,j). The binarizing circuit 71 executes the calculation of either one of the following equations.

If $g^*(i,j) \geq L_t \cdot b(i,j) = 1$ (14)

If $g^*(i,j) < L_t \cdot b(i,j) = 0$ (15)

Therefore, on the basis of the light/dark luminance g*(i,j) after completion of the spatial filtering, the pixel whose luminance value is above the threshold value $L_t$ is recognized as a pixel corresponding to the floc and is set to the "1" level. On the contrary, the portion whose luminance value is lower than the threshold value $L_t$ is recognized as a pixel other than the floc and is set to the "0" level. Consequently, a set of pixels which are represented by the "1" level are recognized flocs. FIG. 18 shows the result of the binarization of the luminance values of FIG. 17 when the threshold value $L_t$ is set to 2. Assuming that the whole image constituted by b(i,j) as the result of the binarization is B, the image B is stored into the binarization memory 72. The image B is input to the diameter distribution calculating means 80 as shown in FIG. 1 and the floc diameter distribution is calculated.

The diameter distribution calculating means 80 obtains the diameter distribution in the following manner.

In the embodiment, after the luminance gradient of the floc image was emphasized using the load product sum matrix in the spatial filtering circuit 61, the luminance values are binarized. Therefore, the flocs can be recognized by clearly distinguishing the flocs from the background. This point will be practically explained hereinbelow with reference to FIG. 19.

FIG. 19(A) shows a luminance distribution in one-dimensional direction of a large floc in the case of the luminance $g_0(i,j)$ of a light/dark image. The luminance $g^*(i,j)$ which is derived after such a bright floc image was subjected to the spatial filtering increases, namely, the floc further becomes bright since the luminance gradient between the floc and the background is emphasized as shown in FIG. 19(B). In the case of a small floc shown in FIG. 19(C), the luminance of the floc is also similarly emphasized as shown in FIG. 19(D). Therefore, by binarizing the luminance values on the basis of the threshold value $L_t$ as shown in FIGS. 19(B) and 19(D), the floc can be binarized irrespective of the size of floc.

In the foregoing embodiment, the description has been made with respect to that the luminance of the floc can be emphasized using the load product sum matrix F as shown in FIG. 15. However, since the load product sum matrix is set such that the sum of load product sum coefficients becomes 0, the luminance of the background having a gentle luminance gradient can be set to 0. Although the luminance of the background changes in dependence on the intensity of illumination, its luminance level is always set to 0 by the spatial filtering, so that the contrast between the floc and the background can be effectively emphasized. Also, this operation does not change even if the intensity of the illumination varies. Therefore, even if the intensity of illumination is gradually weakened due to the measurement for a long time, the floc can be stably recognized without being influenced by the reduction of the illumination.

The foregoing embodiment has been described with respect to the case where the size of floc corresponds to about one pixel. An explanation will now be made with regard to the example of such an image that flocs are constituted by a plurality of pixels and the light/dark image data $g_0(i,j)$ is as shown in FIG. 20. FIG. 20 shows the case where the flocs having the luminance values of 3 to 4 exist in the background of the luminance value of 1. As the result of that the image of FIG. 20 was subjected to the spatial filtering by the equation (11) using the load product sum matrix F of FIG. 15, $g^*(i,j)$ becomes as shown in FIG. 21. As will be understood from FIGS. 20 and 21, the luminances of the flocs are emphasized by the spatial filtering. When the light/dark image after completion of the filtering process shown in FIG. 21 is binarized on the basis of the threshold value of 2, the result will be as shown in FIG. 22.

An example in which the size n of the load product sum matrix is 3 or more in this invention will now be explained. According to this example, n is set to 5 and the luminance of floc can be further accurately emphasized than the case where n=3.

In this example, it is assumed that the load product sum matrix F of the spatial filtering circuit 61 was given by FIG. 23. With this matrix F, the following effects are obtained. (1) The floc consisting of a plurality of pixels can be also emphasized. (Namely, the luminance of a flat floc whose peak portion consists of about three pixels can be also emphasized.) (2) The noise of about one pixel can be eliminated. (3) The luminance of a small floc consisting of about one to two pixels can be emphasized.

The operation of the above items (1) to (3) will now be explained hereinbelow.

Figure 24:
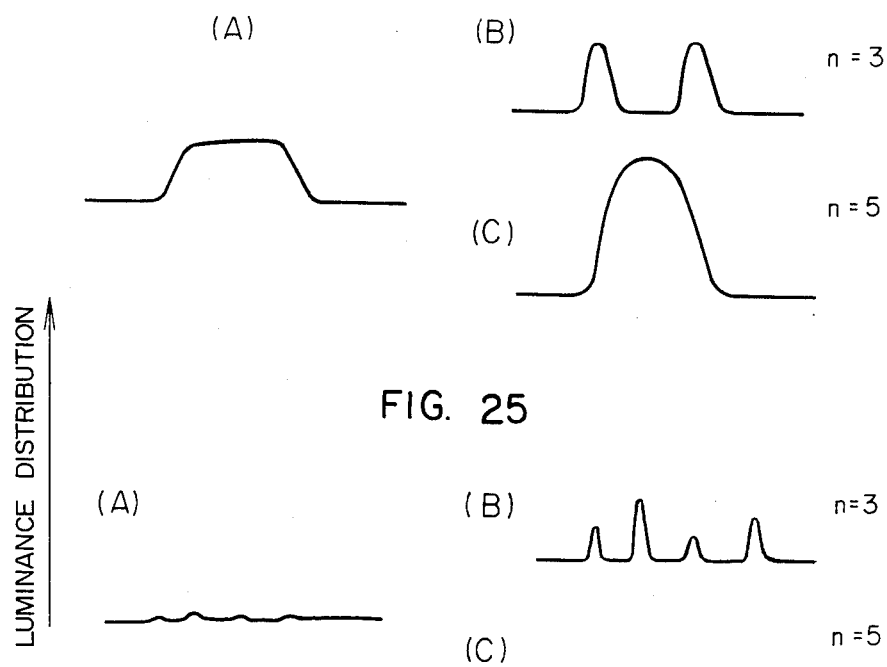
Figure 25:
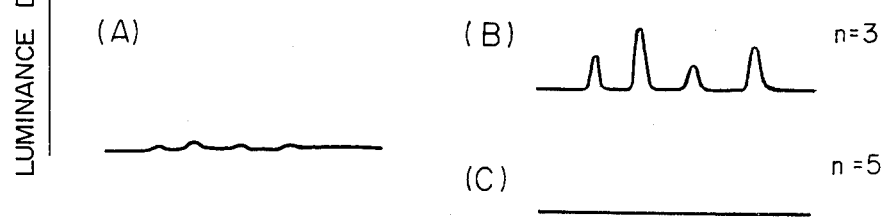
Figure 26:
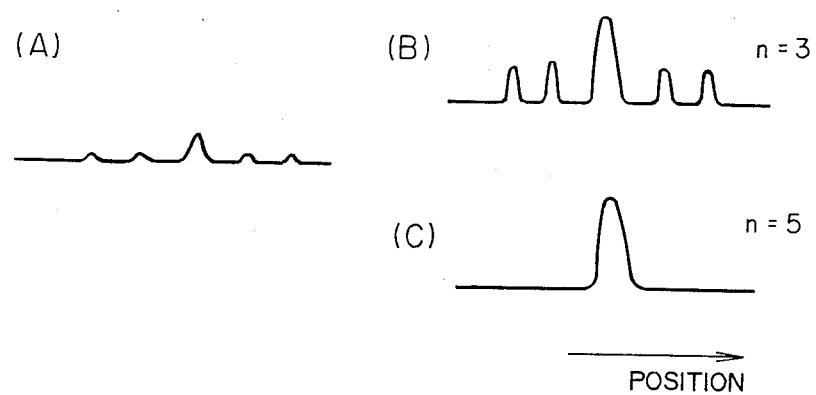

The operation when the load product sum matrix F (n=5) shown in FIG. 23 and the load product sum matrix (n=3) shown in FIG. 15 are applied will be described with reference to FIGS. 24 to 26.

FIG. 24(A) shows an example in which there is a flat luminance peak in the luminance distribution in one-dimensional direction of the floc. Since the luminance change is small in the case of such a peak, when the spatial filtering is executed using the load product sum matrix F shown in FIG. 15, the luminance of the peak becomes 0 as shown in FIG. 25(B). However, when the spatial filtering is performed using the load product sum matrix shown in FIG. 23, the peak portion does not become 0 but is emphasized as shown in FIG. 26(C). Therefore, the binarization can be effectively performed using the emphasized portion as a floc.

The noise removing operation will now be explained. FIG. 25(A) shows a luminance distribution in one-dimensional direction of the noise of a one-pixel unit which is caused in the image pickup camera. By processing such a noise by use of the load product sum matrix F shown in FIG. 15, the luminance of the noise is emphasized as shown in FIG. 25(B). This is because in the case of the load product sum matrix shown in FIG. 15, the luminance of the noise of one pixel is also emphasized since only the value of the central pixel is positive. However, by calculating the spatial filtering using the load product sum matrix (n=5) shown in FIG. 23, the luminance can be set to 0 as shown in FIG. 25(C). Namely, the influence by the noise can be eliminated.

FIG. 26(A) shows the case where a small floc exists in the noise. FIG. 26(B) shows the result of the process using the load product sum matrix shown in FIG. 15. FIG. 26(C) shows the result of the process using the load product sum matrix shown in FIG. 23.

As described above, the noise can be eliminated and at the same time, the luminance of the small floc can be emphasized.

As described above, by executing the spatial filtering using the load product sum matrix of n=5, the luminance of floc can be further effectively emphasized than the case where n=3.

In the load product sum matrix F, by setting the value of the central pixel to be high and by setting the values of the pixels around the central pixel to be low as shown in FIG. 23, the luminance of floc (the luminance of the central pixel is high and the luminances of the pixels around the central pixel are low) can be effectively emphasized. When a load product sum matrix of n of 5 or more is used, the similar effect can be also derived.

According to this embodiment, the luminance of floc is emphasized by the spatial filtering and the luminances of the background are uniform, thereby clarifying the boundary between the flocs and the background. Also, the luminance of the noise other than the flocs can be relatively suppressed. Therefore, only the luminance of the floc can be selectively emphasized without being influenced by a gentle change in luminance of the background due to a fluctuation, a time-dependent change, or the like of the illumination and further by the noise of the image pickup system. According to the invention, after the luminance of floc was emphasized, the floc is recognized by the binarization as described above. Therefore, the floc image can be accurately recognized.

The present invention can be applied to the image recognition of flocculated particles and particle-shaped matters other than the flocs in the water purifying plant. For example, the invention can be applied to the image measurement of active sludge flocs in the sewage treatment plant, the diameter measurement of immobilized particles which are formed by immobilizing microorganisms so as to become particles by use of an immobilizing agent such as sodium alginate or the like, the measurement of agglutinated matters in the immunoreaction, or the like. Moreover, the invention can be also applied to the measurement of any powder such as dust coal, flour, and the like.

Figure 27A:
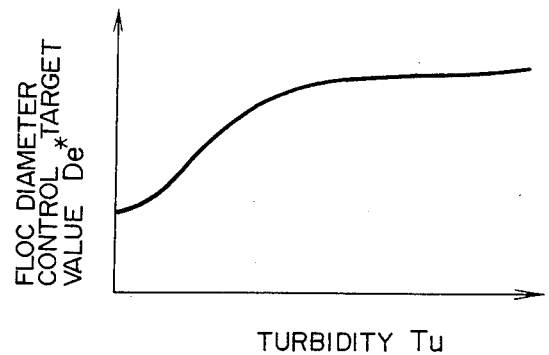
FIG. 27A is a graph showing the relation between the control target value of a floc diameter and the turbidity.

On the other hand, a turbidity signal $T_u$ obtained from a turbidimeter 5 is input to the target value setting device 102A. A control target value $D^*_l$ of the floc diameter is determined as shown in a graph of FIG. 27A on the basis of the value of $T_u$. Namely, the control target value $D^*_l$ of the floc diameter is increased as the turbidity $T_u$ rises. However, even if the turbidity is high, the floc is not grown to a diameter in excess of a predetermined value but only the number of flocs increases. Therefore, a number of relatively large flocs appear, so that the average diameter of floc slowly increases. The control target value $D^*_l$ of the floc diameter is determined for the turbidity on the basis of such a characteristic as shown in FIG. 27A.

The comparator 101A obtains the deviation $\Delta D_l$ between the calculated value $D_l$ and the target value $D^*_l$ of the geometric mean diameter which is set by the target value setting device 102A in accordance with the following equation.

$$\Delta D_l D_l - D^*_l \qquad (9)$$

The injection control circuit 103A operates the injection pump 12 on the basis of the deviation $\Delta D_l$, thereby controlling an injection amount of the flocculating agent. Practically speaking, when the deviation $\Delta D_l$ has a negative value, the injection amount is increased. On the contrary, when it has a positive value, the injection amount is decreased. There is such a characteristic relation as shown in FIG. 8 between the geometric mean diameter $D_l$ and the flocculating agent injection amount P. The abnormal injection is prevented by setting the maximum injection amount $P_{max}$ and the minimum injection amount $P_{min}$ for the flocculating agent injection amount.

The injection of the flocculating agent is controlled as described above. Since the flocculating agent injection amount is controlled by changing the control target value of the diameter of floc in accordance with the degree of the turbidity of the raw water, flocs can be preferably formed. Thus, the turbidity of the precipitation pool can be stably maintained to a value below a predetermined value.

In the foregoing embodiment, after the luminance gradient of the floc image was emphasized by use of the load product sum matrix in the spatial filtering circuit 61, the luminance values are binarized. Therefore, the flocs can be also recognized by clearly distinguishing the flocs from the background.

Figure 27B:
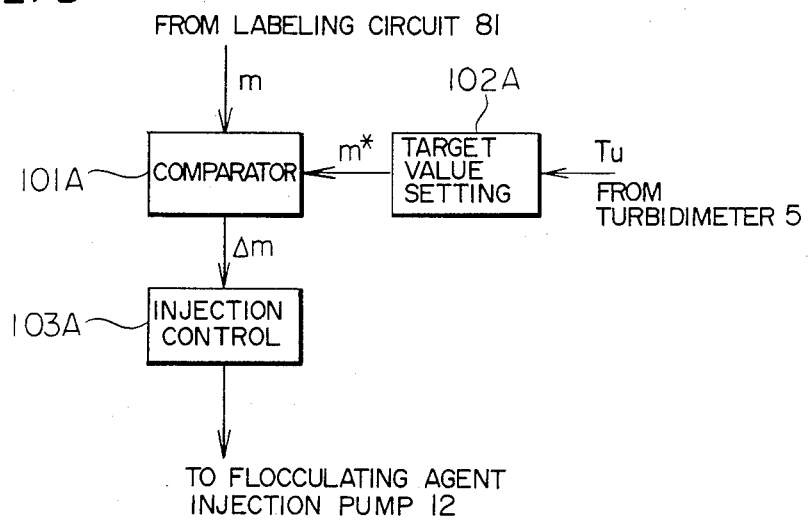
FIG. 27B is a constitutional diagram showing an example of an injection control device.

An explanation will now be made with respect to an embodiment of an example in which the injection amount of the flocculating agent is controlled on the basis of the turbidity $T_u$ of the raw water and the number m of flocs. In general, the floc number concentration may be used as the number of flocs. In this embodiment, the number m of flocs is input to the injection control device 100 in FIG. 1 from the labeling circuit 81 of the diameter distribution calculating means 80. The turbidity signal $T_u$ from the turbidimeter is input to the injection control device 100. The flocculating agent injection amount is controlled on the basis of those values. FIG. 27B shows a constitution of the injection control device 100. The number m of flocs is input to a comparator 101A. On the other hand, the turbidity value $T_u$ measured by the turbidimeter 5 is input to a target value setting circuit 102A. The setting circuit 102A determines a target value $m^*$ of the floc number m on the basis of the turbidity value $T_u$ as shown in a graph of FIG. 28. Namely, when the turbidity value $T_u$ is high, there is such a tendency that the number of flocs increases; therefore, the floc number target value $m^*$ is increased as the turbidity value $T_u$ rises. As described above, when the turbidity is high, the flocculating agent is injected such that the flocs as many as the high turbidity are formed. Practically speaking, the floc number target value $m^*$ which is set by the target value setting circuit 102A is input to the comparator 101A. The measured value m indicative of the actual number of flocs is also input to the comparator 101A. The deviation $\Delta m$ between measured value m and the target value $m^*$ is calculated by the following equation.

$$\Delta m = m - m^* \qquad (10')$$

An injection control circuit 103A receives the deviation $\Delta m$ and controls the injection amount of the flocculating agent in the following manner. When the value of $\Delta m$ is positive, the measured value m of the floc number is larger than the target value $m^*$; therefore, this means that the flocculating agent injected is too much. In this case, the injection amount is reduced. On the contrary, when the value of $\Delta m$ is negative, m is smaller than $m^*$. Therefore, the injection amount is increased, thereby allowing a number of flocs to be formed. By increasing the injection amount of the flocculating agent, a more number of flocs are formed.

As described above, since the flocs can be always preferably formed irrespective of the turbidity of the raw water, the turbidity at the outlet of the precipitation pool can be stably maintained to a value below a predetermined value. In addition, although not shown, a large effect can be also derived by measuring the turbidity at the outlet of the precipitation pool and by further increasing the flocculating agent injection amount when the turbidity at the outlet exceeds a predetermined value in order to enhance the safety.

On the other hand, when the floc image pickup means 18 is attached in the first pool 15A of the floc forming pool 15, a change in floc formation state can be promptly detected. Therefore, it is better to attach the image pickup means 18 in the first pool in order to make the control response speed high.

Figure 31:
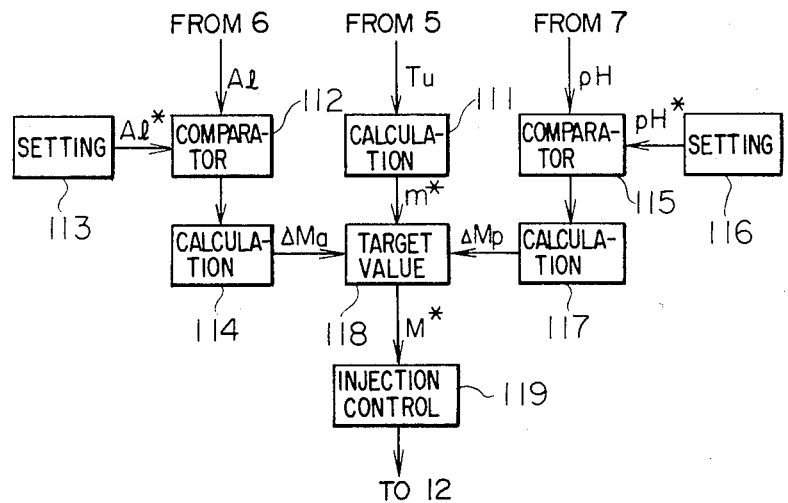
FIG. 31 is a constitutional diagram showing another example of the injection control device.

Further, detection signals of an alkalinity measuring instrument 6 and a pH measuring instrument 7 as shown in FIG. 31 are input to the injection control device 100, thereby controlling the target value of the floc number and the geometric mean diameter.

Figure 28:
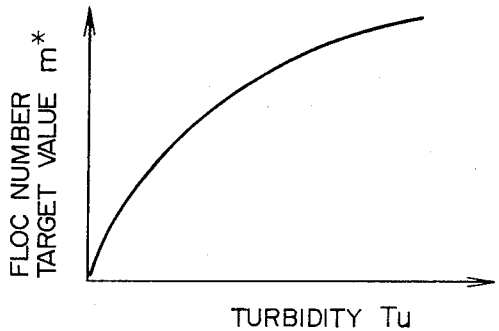
FIG. 28 is a graph showing the relation between the target value of the number of flocs and the turbidity.
Figure 29:
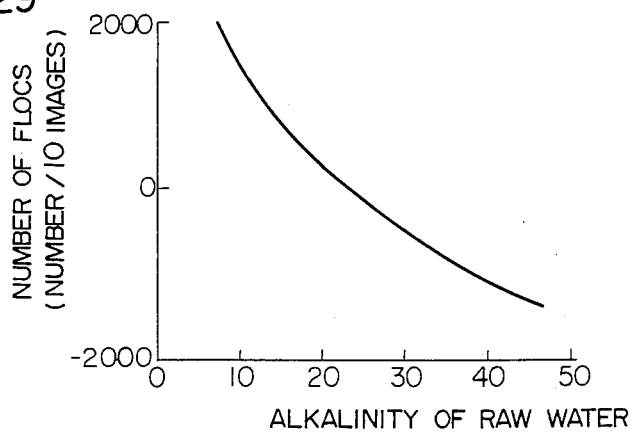
FIG. 29 is a graph showing the relation between the number of flocs and the alkalinity of the raw water.
Figure 30:
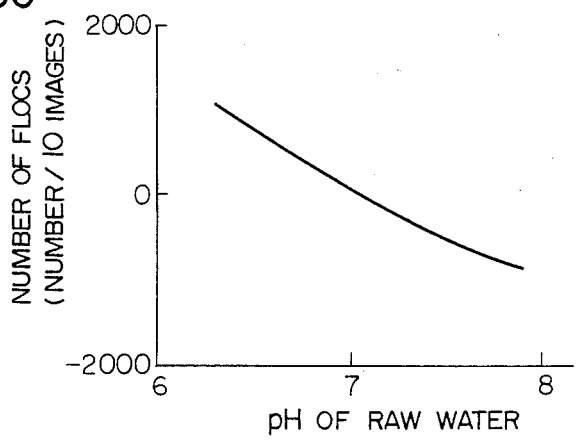
FIG. 30 is a graph showing the relation between the number of flocs and the value of pH of the raw water.

According to the experiments and experiences of the inventors, the tendency of formation of flocs can be predicted by detecting the foregoing three factors of the water quality. FIG. 28 is a graph showing the results of the measurement of the suspended matter concentration (i.e., turbidity) $T_u$ of the raw water and of the number of flocs when the injection amount of the flocculating agent was properly maintained. It will be understood from FIG. 28 that the number of flocs increases as the concentration $T_u$ rises and there is a correlation therebetween. FIG. 29 shows a change in number of flocs to a change in alkalinity when the flocculating agent injection amount and the suspended matter concentration $T_u$ were maintained constant. It will be understood from this graph that there is such a tendency that the number of flocs decreases with an increase in alkalinity Al. Further, FIG. 30 shows the result of the measurement of the number of flocs when the other water quality condition and the injection amount were maintained to values within special ranges and pH was changed. It will be understood from this graph that the number of flocs also varies by a change in pH. It will be understood from those results that although the number of flocs formed increases as the concentration $T_u$ of the suspended matters of the inflow raw water rises, but the increases in alkalinity and pH function as restrainers. On the other hand, in order to obtain the good treatment water in which the suspended matters hardly exists in the precipitation pool (not shown), the flocs as many as the turbidity $T_u$ must be formed in the floc forming pool before the precipitation pool. Therefore, the floc number target value m* is corrected and calculated in the following manner. FIG. 31 shows a constitutional diagram of an example of the injection control device 100. The concentration $T_u$ of the suspended matters detected by the turbidity detecting means 5 is input to a calculating circuit 111. The optimum value m* of the number of flocs is calculated for the turbidity $T_u$ and output to a target value calculating circuit 118. In this case, the floc number optimum value m* is calculated when the alkalinity is set to a reference value Al and the pH is set to a reference value pH*. The alkalinity Al detected by the alkalinity detecting means 6 is input to a comparator 112 and compared with the reference alkalinity value Al which is preset by a setting circuit 113. The deviation ΔAl is output to a calculating circuit 114. The calculating circuit 114 calculates a correction amount $\Delta M_a$ of the number of flocs corresponding to the deviation ΔAl of the alkalinity and outputs to the target value calculating circuit 118. On the other hand, the pH detected by the pH detecting means 7 is input to a comparator 115 and compared with the pH reference value pH* which is preset by a setting circuit 116. The deviation ΔpH is output to a calculating circuit 117. A correction amount $\Delta M_p$ of the number of flocs corresponding to the deviation ΔpH of the pH is calculated in the calculating circuit 117 and output to the target value calculating circuit 118. The calculating circuit 118 calculates the target value M* of the number of flocs on the basis of the floc number optimum value m* and the correction amounts $\Delta M_a$ and $\Delta M_p$ and inputs to an injection control circuit 119. The injection control circuit 119 operates the flocculating agent injection pump 12, thereby increasing or decreasing the injection amount of the flocculating agent.

An electric conductivity measuring instrument may be also used in place of the alkalinity measuring instrument. The volume of floc can be also used as a parameter indicative of the floc formation state.

As described above, in this embodiment, the flocculating agent is injected in accordance with the water quality and the floc formation state, so that the flocs can be preferably formed.

We claim:

1. An injection control system for a flocculating agent comprising:
   a flocculating pool into which an inflow liquid flocculating agent is injected and which forms flocs of suspended matters in said liquid;
   flocculating agent injecting means for injecting the flocculating agent into said flocculating pool;
   floc image pickup means for photographing flocs in the flocculating pool and for producing electric signals that are related to luminance of the flocs to establish an image signal composed of pixels;
   image recognizing means for binarizing the electrical siganls obtained from said floc image pickup means corresponding to said pixels which have a brightness value above a predetermined luminance level to produce a manifestation of the shape of flocs exceeding a predetermined size;
   means responsive to said binarized signals for calculating a characteristic amount of a diameter distribution of the flocs on the basis of the floc shape manifestations; and
   injection amount control means for controlling an amount of flocculating agent which is injected from said flocculating agent injecting means responsive to said calculated characteristic amount.

2. An injection control system according to claim 1, wherein said characteristic amount is a geometric mean diameter.

3. An injection control system according to claim 1, wherein said image recognizing means includes means for emplasizing the image signal to provide clarification to boundaries of said flocs before binarization of said image signal.

4. An injection control system according to claim 1, wherein said image recognizing means includes: means for storing light/dark image data; means for emphasizing a luminance gradient of the flocs to produce an enhanced signal indicative of a floc boundary; and means for binarizing the floc boundary signal.

5. An injection control system according to claim 3, wherein said means for emphasizing the image signal includes a load product sum matrix for spatial filtering.

6. An injection control system according to claim 2, wherein said binarized signal responsive means includes: labeling means for labeling at least part of the flocs; means for calculating a floc area of every labeled floc; means for calculating a diameter of a circle having an area equal to the area of each floc; means for calculating a volume of a sphere from the diameter calculated by said means; means for calculating a diameter distribution of the labeled flocs; and means for calculating a volume concentration distribution from said diameter distribution.

7. A floc image recognizing apparatus comprising:
   a flocculating pool for forming flocs of suspended particulate material contained in a liquid;

floc image pickup means for photographing flocs in said flocculating pool and for converting photographed luminance into an electric signal;

light/dark image memory means for storing light-/dark image data of said flocs on the basis of the electric signal derived from said floc image pickup means to product a light/dark image signal; said electric signal being composed of pixels;

luminance emphasizing means for emplasizing the luminance of a floc portion of said light/dark image signal to produce an enhancement of a floc boundary; and means for binarizing the light/dark image signal derived from said luminance emphasizing means on the basis of a luminance level of every pixel, wherein the flocs and the background particulate materials other than the flocs are discriminated by the binary signal obtained from said binarizing means.

8. An image recognizing apparatus according to claim 7, wherein said luminance emphasizing means includes a load product sum matrix as part of a spatial filtering means.

9. A floc formation control apparatus comprising:
a flocculating pool into which a flocculating agent is injected and which forms floc formations of suspended particulate materials by stirring a liquid;
a water quality measuring instrument for measuring turbidity, alkalinity, and pH of the liquid which flows into said flocculating pool and producing at least one output signal;
flock iamge pickup means for converting floc formations into an electric signal;
image recognizing means for recognizing a characteristic diameter of the flocs on the basis of the image signal derived from said floc image pickup means;
flocculation state deciding means for determining a floc formation state on the basis of said characteristic diameter; and
an injection control device for controlling an injection amount of the flocculating agent on the basis of an output signal from said flocculation state deciding means and the output signals from said water quality measuring instrument.

10. A floc formation control apparatus according to claim 9, wherein the flocculation state which is determined by said flocculation state deciding means is a geometric mean diameter of the floc formations and said injection control device allows the flocculating agent to be injected so as to increase a target value of said geometric mean diameter when turbidity is high.

11. A method of recognizing an image of flocs of particulates in a flocculating pool providing a liquid background comprising the steps of:
generating electric signals based on luminance of the flocs;
storing an image of the flocs on the basis of the electric siganls; and
emphasizing the luminance of the floc portion by applying said electric siganls to a spatial filter composed of a plurality of pixels arranged to enhance the definition of the floc boundary with respect to the liquid background.

12. A floc image recognition apparatus in association with a flocculating pool where formations of flocs of particulate occur comprising:

floc formation image pickup means for converting a luminance of the floc formations into electric signals; and image memory means for storing an image of said flocs on the basis of the electric signals derived from said floc image pickup means; said memory means including means for producing a signal indicative of a floc formation boundary and luminance emphasizing means for emphasizing the luminance of the floc portion of said image memory means.

13. A method of controlling the formation of flocs in a floc forming process having a flocculating pool to form the flocs of suspended matters, comprising the steps of:
converting a floc formation into electric signals;
recognizing a characteristic parameter of the floc formation on the basis of image signal derived by said converting step, said image signal being composed of pixels that represent an area smaller than the size of a floc;
determining the floc formation shape and size on the basis of said characteristic parameter by modifying said electric signals in a matrix having at least five pixels in each of two orthogonal directions, said matrix also having a floc formation signal level in only a portion of the pixels in said matrix that is higher than a background signal level, and averaging the total signal level in said matrix so that the signal level in the pixels immediately surrounding the pixels having signals representing a floc formation is decreased to a level less than the background reference level to produce an emphasized output signal; and
controlling an injection amount of a flocculating agent on the basis of the result of said emphasized output signal.

14. A floc formation control apparatus in a floc forming process involving a flocculating pool wherein flocs of particulate material are formed, comprising:
floc image pickup means for converting a floc formation into a electric signals to establish an image signal composed of pixels that represent an area having a size smaller than the size of a floc formation;
image recognizing means for recognizing a characteristic amount of the floc formations on the basis of the image signal derived from said floc image pickup means including a matrix image area defined by five pixels in each of two orthogonal directions, said matrix having a floc formation signal level in only a portion of the pixels in said matrix that is higher than a background signal level, and means for averaging the total signal level in said matrix so that the signal level in the pixels immediately surrounding the pixels having signals representing a floc formation is decreased to a level less than the background reference level to produce an emphasized output signal;
flocculation state deciding means for determining a floc formation parameter on the basis of said emphasized output signal; and
an injection control device for controlling an injection amount of a flocculating agent on the basis of an output signal from said flocculation state deciding means.

15. A method of controlling a floc formation in a floc forming process having a flocculating pool where flocs of suspended particulate material are formed and a water quality measuring instrument to measure a water quality of a liquid which flows into said flocculating pool comprising the steps of:

converting a condition of said flocs into an electric signal by photographing the flocs in the pool to produce electrical signals corresponding to luminance of the flocs to establish an image signal composed of pixels that represent an area having a size smaller than the size of a floc so that a mean geometric diameter of a floc has a size not less than two pixels;

recognizing a characteristic condition of the flocs on the basis of the electric signal derived by said converting step;

determining a floc formation parameter by modifying said electric signal in a spatial filter having a load product sum matrix image area with not less than five pixels in each of two orthogonal directions so that when the total signal level of the matrix image area is averaged, the signal level in the pixels representing a floc is increased and the signal level in the pixels of the matrix immediately surrounding said flocs representing pixels is decreased to a level less than a background reference level thereby to produce an emphasized output signal relating to said floc boundary; and controlling an injection amount of a flocculating agent on the basis of the determined floc formation parameter and the value derived from said water quality measuring instrument.

16. A floc formation control apparatus in a floc forming process involving a flocculating pool wherein flocs of suspended particulate material are formed and a water quality measuring instrument to measure a water quality of a liquid which flows into said flocculating pool, comprising:

means for photographiing flocs in the pool to produce electrical signals corresponding to luminance of the flocs to establish an image signal composed of pixels that represent an area having a size smaller than the size of a floc so that a mean geometric diameter of a floc has a size not less than two pixels;

means for emplasizing the boundary of a floc including a spatial filter having a load product sum matrix image area containing not less than five pixels in each of two orthogonal directions including means supplying said electrical signals to said spatial filter with a floc positioned near the center of said matrix image area and for averaging the signal level in the matrix image area so that the signal level of the pixels representing a floc is increased and the signal level in the pixels surrounding said floc representing pixels is decreased to a level less than the background reference level and thereby emphasize the difference between the signal level representing a flocs and a signal level representing the background in the pixel immediately surrounding a floc representing pixel;

means for recognizing a size of the flocs on the basis of the signal level representing said flocs;

flocculation state deciding means for determining a floc formation parameter on the basis of said size; and an injection control device for controlling an injection amount of a flocculating agent on the basis of the output signal from said recognizing means and the value obtained from said water quality measuring instrument.

17. In a method for determining floc concentration in a pool of a liquid containing flocs of suspended particulate material:

photographing the flocs in the pool to produce electrical signals corresponding to luminance of the flocs to establish an image signal composed of pixels that represent an area having a size smaller than the size of a floc so that a mean geometric diameter of a floc has a size not less than two pixels; and modifying said electrical signals in a spatial filter having a load product sum matrix image area with not less than five pixels in each of two orthogonal directions so that when the total signal level of the matrix image area is averaged, the signal level in the pixels representing a floc is increased and the signal level in the pixels of the matrix immediately surrounding the signals representing said flocs is decreased to a level less than a background reference level thereby to produce an emphasized output signal relating to said floc boundary.

18. In an imaging apparatus for recognizing floc concentration in a pool of liquid containing flocs of suspended particulate material:

means for photographing flcos in the pool to produce electrical siganls corresponding to luminance of the flocs to establish an image signal composed of pixels that represent an area having a size smaller than the size of a floc so that a mean geometric diameter of a floc has a size not less than two pixels; and means for emphasizing the boundary of a floc including a spatial filter having a load product sum matrix image area containing not less than five pixels in each of two orthogonal directions including means supplying said electrical signals to said spatial filter with a floc positioned near the center of said matrix image area and for averaging the signal level in the matrix image area so that the signal level in the pixels representing a floc is increased and the signal level in the pixels surrounding said floc representing pixels is decreased to a level less than the background reference level and thereby increase the difference between the signal level representing a floc in a pixel and the signal level representing a background in the pixel immediately surrounding a floc representing pixel.

* * * * *